Figure 1:
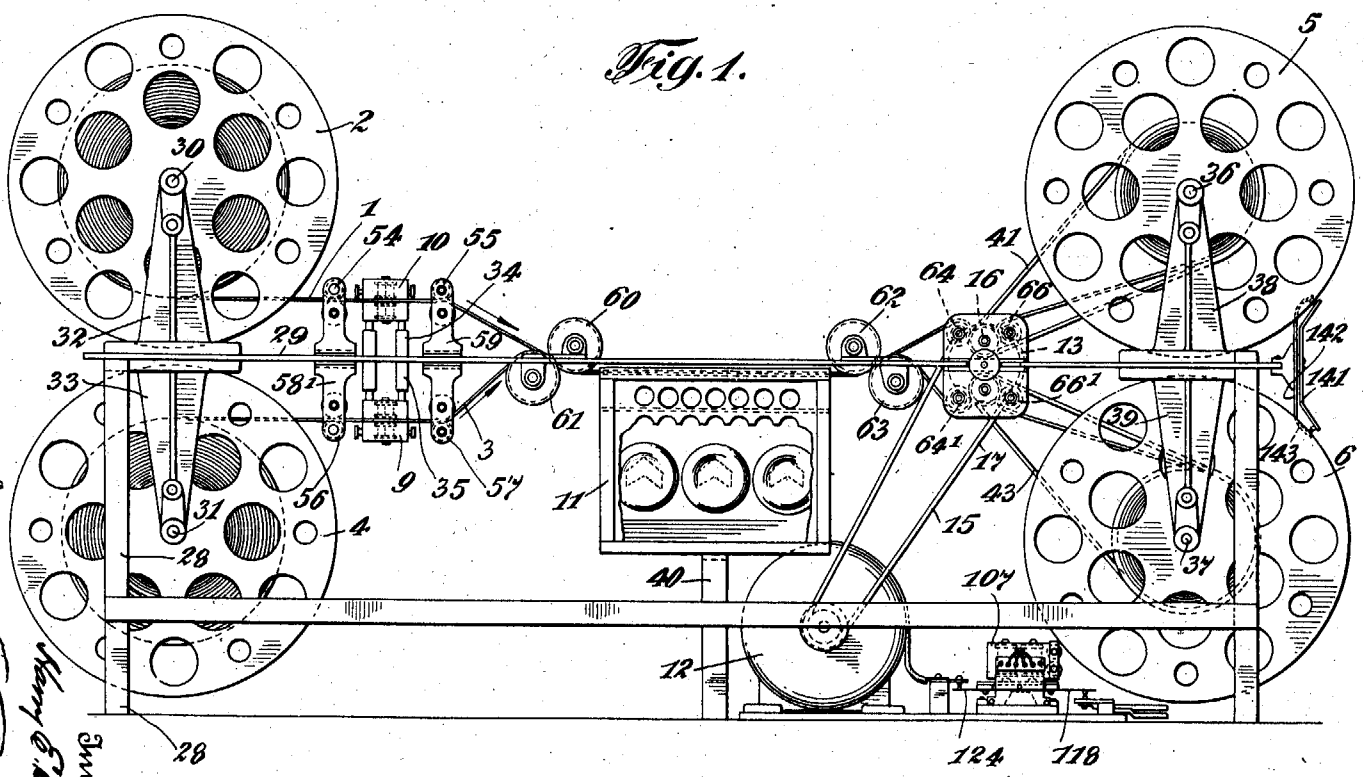

April 5, 1927. Re. 16,586

H. E. CHIPMAN

TALKING PICTURE TRANSFER MECHANISM

Original Filed Jan. 26, 1921 7 Sheets-Sheet 1

Inventor
Harry E. Chipman
By
F. T. Edwards
his Attorney

April 5, 1927. Re. 16,586

H. E. CHIPMAN

TALKING PICTURE TRANSFER MECHANISM

Original Filed Jan. 26, 1921 7 Sheets-Sheet 2

Inventor
Harry E. Chipman
By P. Edmonds
his Attorney

April 5, 1927. Re. 16,586
H. E. CHIPMAN
TALKING PICTURE TRANSFER MECHANISM
Original Filed Jan. 26, 1921 7 Sheets-Sheet 3
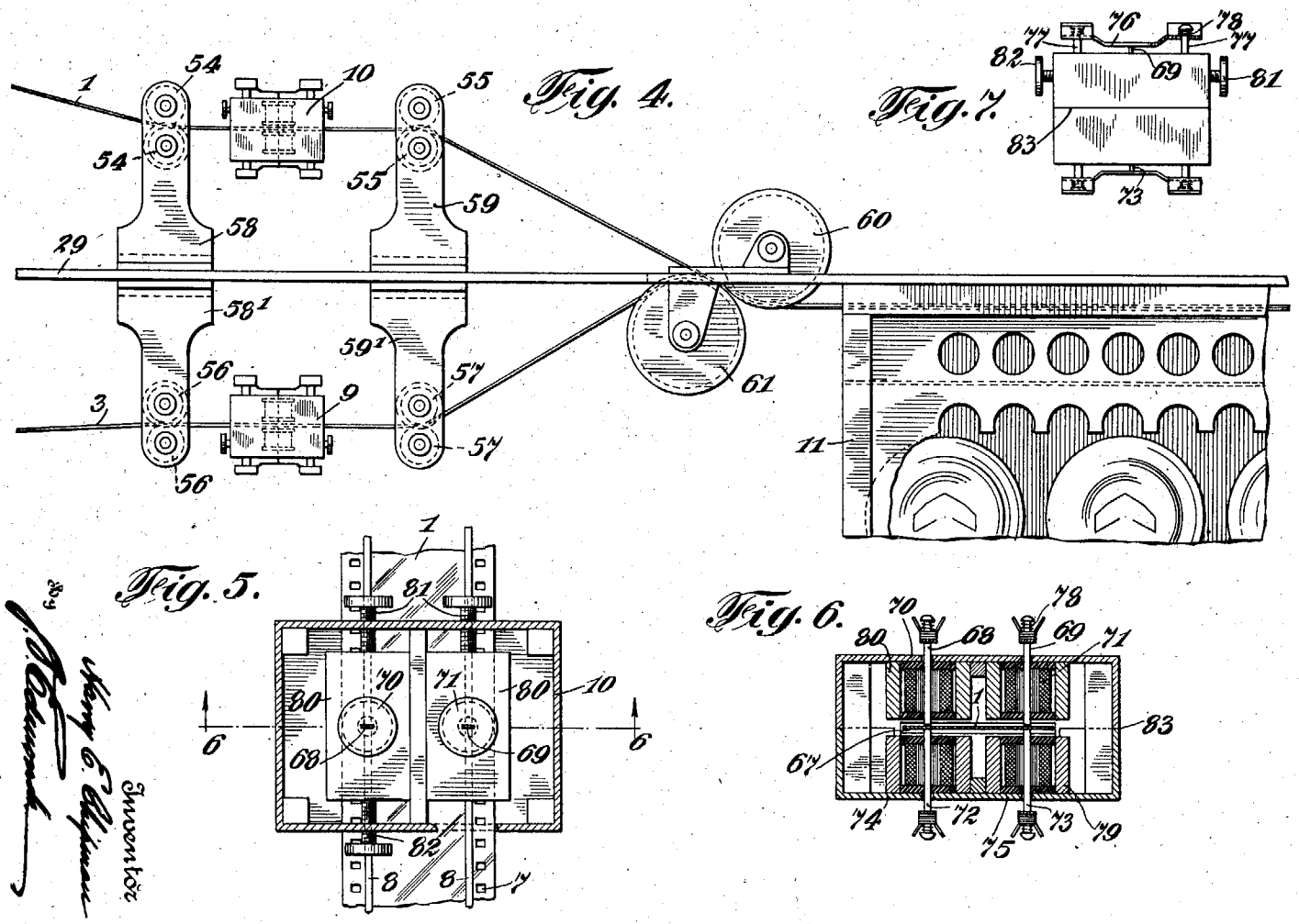
Inventor
Harry E. Chipman
By J. P. Edmonds
his Attorney April 5, 1927. Re. 16,586

H. E. CHIPMAN

TALKING PICTURE TRANSFER MECHANISM

Original Filed Jan. 26, 1921 7 Sheets-Sheet 4

Inventor
Harry E. Chipman
By
J. P. Edwards
his Attorney

April 5, 1927. H. E. CHIPMAN Re. 16,586

TALKING PICTURE TRANSFER MECHANISM

Original Filed Jan. 26, 1921 7 Sheets-Sheet 5

Inventor
Harry E. Chipman
By
J. Edmonds
his Attorney

April 5, 1927. Re. 16,586

H. E. CHIPMAN

TALKING PICTURE TRANSFER MECHANISM

Original Filed Jan. 26, 1921 7 Sheets-Sheet 6

Inventor
Henry E. Chipman
By
his Attorney

April 5, 1927. Re. 16,586

H. E. CHIPMAN

TALKING PICTURE TRANSFER MECHANISM

Original Filed Jan. 26, 1921 7 Sheets-Sheet 7

Inventor
Harry E. Chipman
By F. O. Edmonds
his Attorney

Reissued Apr. 5, 1927. Re. 16,586

UNITED STATES PATENT OFFICE.

HARRY E. CHIPMAN, OF SPRINGFIELD, MASSACHUSETTS, ASSIGNOR, BY DIRECT AND MESNE ASSIGNMENTS, TO WILLIAM A. CHIPMAN AND ANDREW LE ROY CHIPMAN, BOTH OF NEW YORK, N. Y.

TALKING-PICTURE TRANSFER MECHANISM.

Original No. 1,480,992, dated January 15, 1924, Serial No. 439,913, filed January 26, 1921. Application for reissue filed January 13, 1926. Serial No. 81,110.

My invention relates in part to apparatus for transferring magnetic sound records from one strip or member to a similar strip or member. In the preferred form of the device a magnetic sound record on the face of a continuous film carrying negative images to be used in the production of moving pictures is transferred to a similar magnetizable member on a positive film strip at the same time that the negative images are imprinted upon the positive film to form the positive images which are to be used for production.

In my Patent No. 1,612,359, issued December 28, 1926, production and reproduction of talking motion pictures, filed on even date herewith, I have described the production of a magnetic sound record on a metal ribbon or the like carried by the negative motion picture film, the photographic record and the record of the sounds accompanying the action of the picture being recorded simultaneously on the same film strip. For reproduction, a positive must, of course, be printed from the negative photographic images and accordingly the magnetic sound record must be transferred to the positive film strip. The object of my invention is to provide practical and efficient mechanism for transferring the photographic record and the sound record.

In practicing my invention the negative and positive films are progressed at a constant rate past an exposure opening, whereat the positive images are imprinted. The negative film passes between the pole pieces of electro-magnets in which magnetism of varying intensity is induced, corresponding to the varying magnetic intensity of the magnetic sound record of the negative film. Corresponding fluctuations of current are induced in an accompanying circuit, which latter fluctuations, preferably after being considerably amplified, are caused to vary the magnetic field of other electro-magnets, between the pole pieces of which is progressed the strip of magnetizable material on the positive film.

My invention comprises the various combinations of elements and structural details which go to make up an effective apparatus of the character referred to, as will be more fully pointed out hereinafter.

Figure 2:
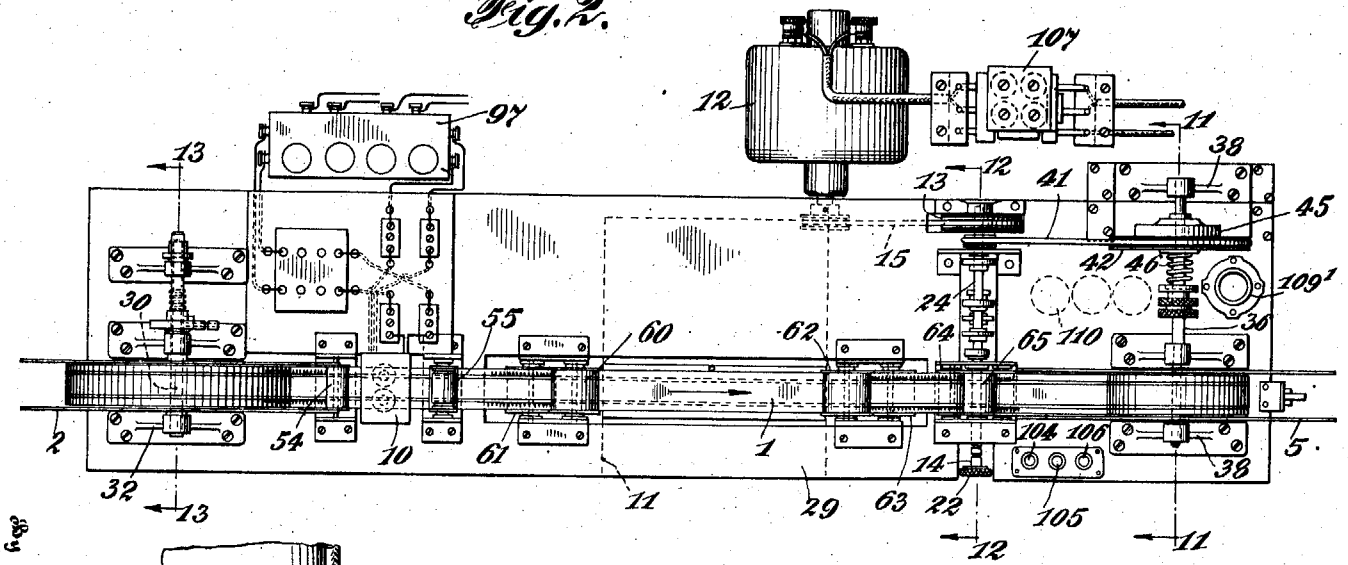
Figure 3:
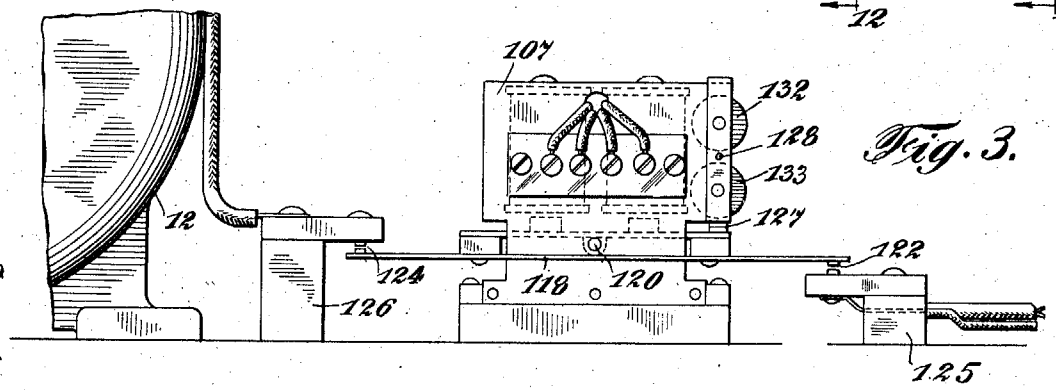
Figure 8:
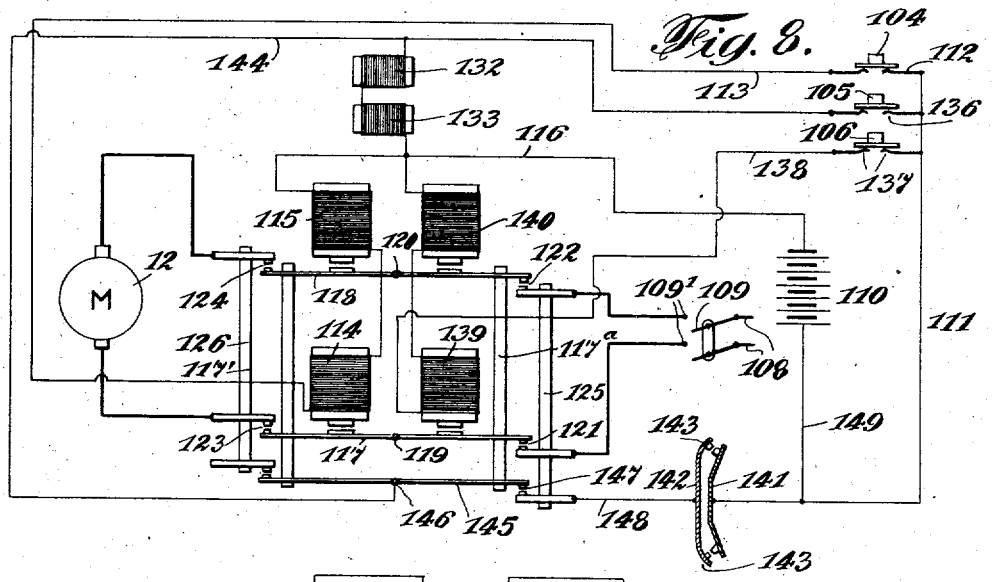
Figure 9:
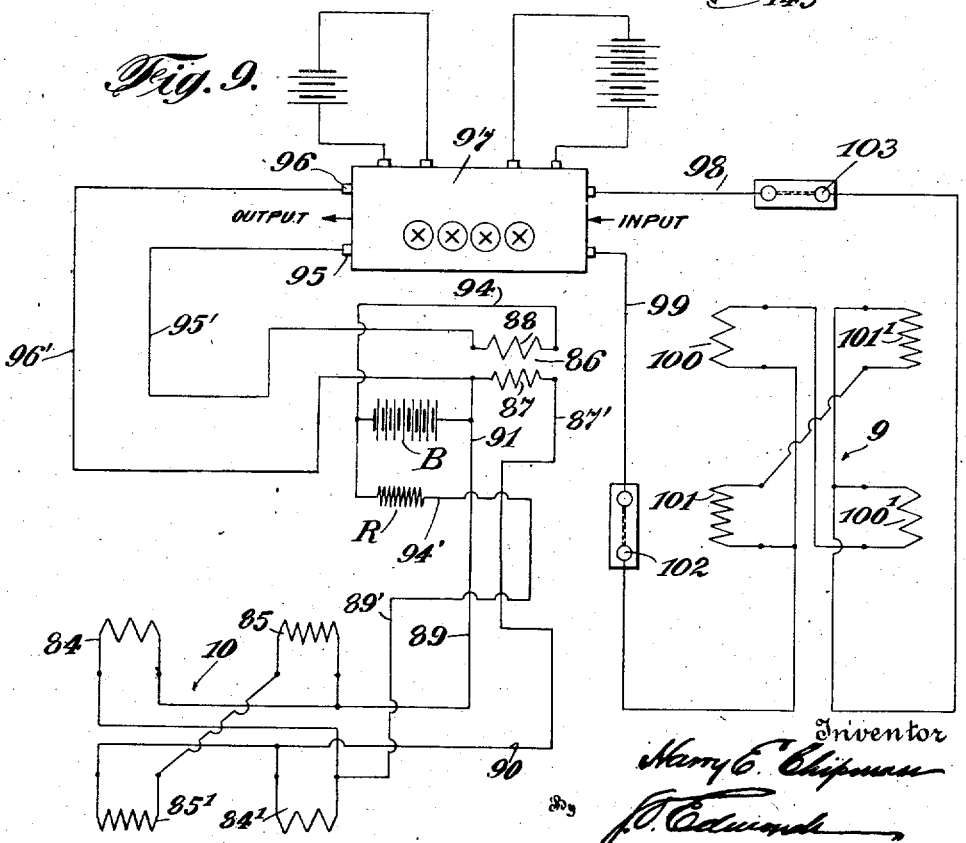
Figure 10:
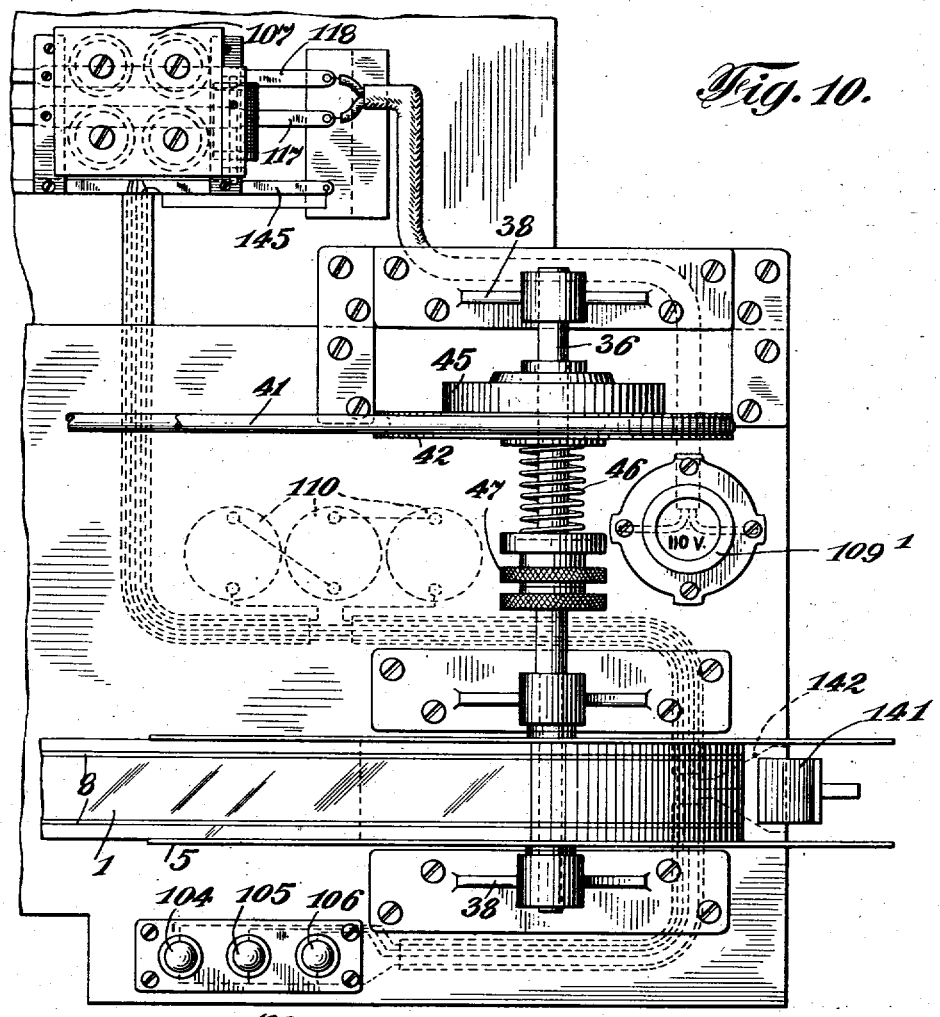
Figure 14:
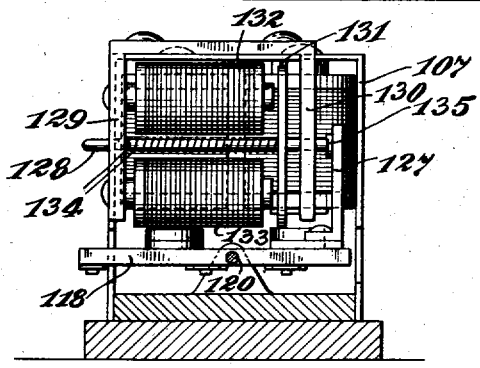
Figure 11:
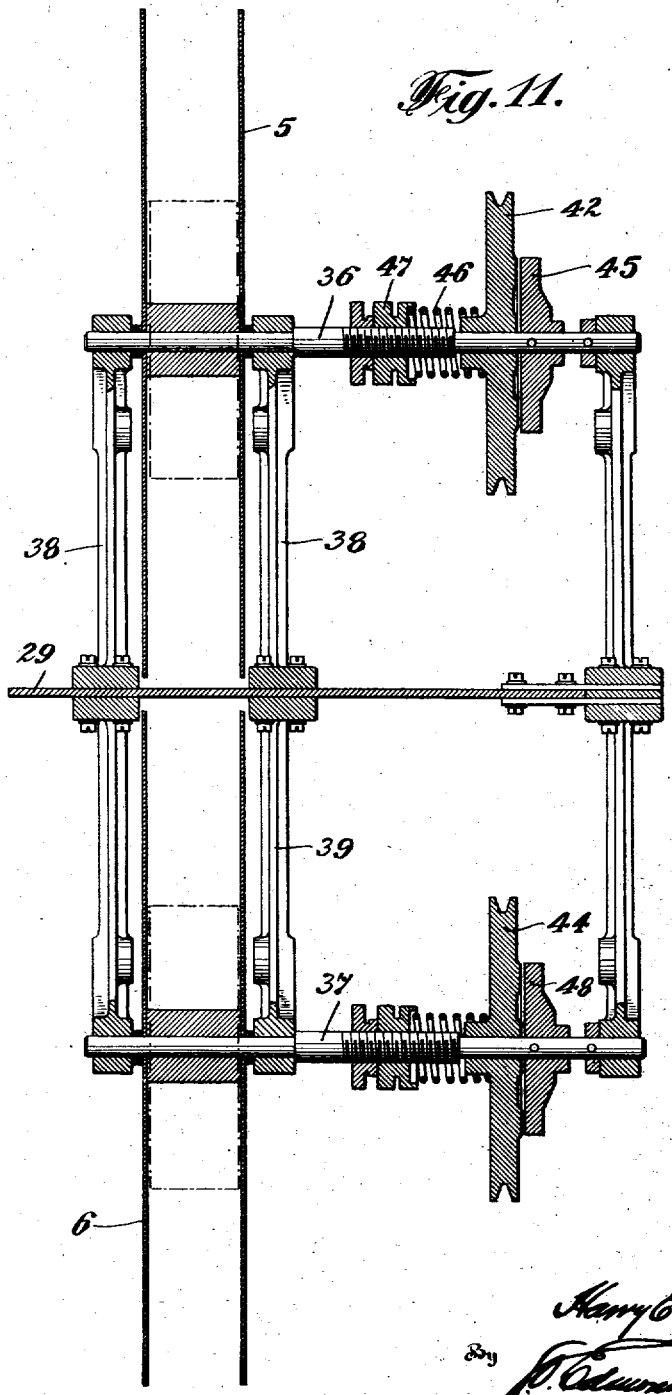
Figure 12:
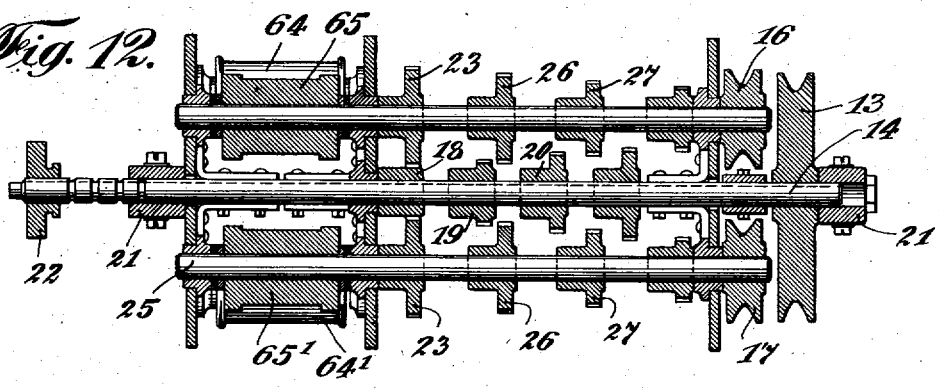
Figure 13:
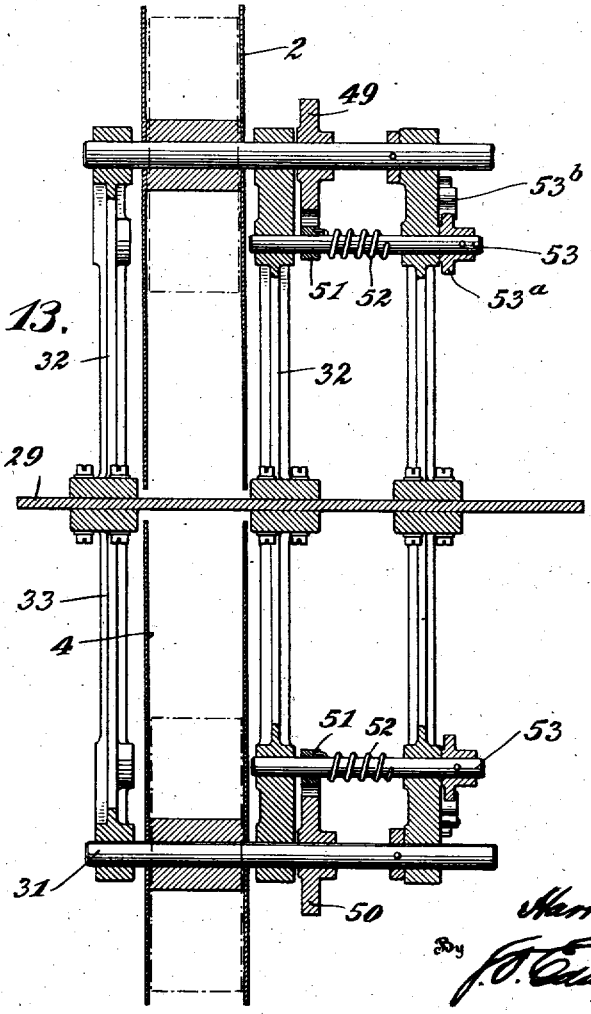

In order that a clearer understanding of my invention may be had attention is hereby directed to the accompanying drawings forming part of this application and illustrating one embodiment of my invention. In the drawings Fig. 1 represents a side elevation of a transfer mechanism of the character referred to embodying my invention; Fig. 2 is a top plan view of the same; Fig. 3 is an enlarged end elevation of a portion of the same; Fig. 4 is an enlarged side elevation of a part of the mechanism shown in Fig. 1; Fig. 5 is a top plan view of either the magnetic reproducing or recording device shown partly in section; Fig. 6 is a section taken on line 6—6 of Fig. 5; Fig. 7 is an end elevation of the apparatus shown in Fig. 6; Fig. 8 is a diagrammatic view of the motor starting, stopping, and locking mechanism, and connections; Fig. 9 is a wiring diagram for the magnetic sound record transfer devices; Fig. 10 is an enlarged partial top plan view of the apparatus corresponding to the right hand end portion of the view shown in Fig. 2; Figs. 11, 12 and 13 are respectively cross sections taken on the lines 11—11, 12—12 and 13—13 of Fig. 2, on enlarged scales; and Fig. 14 is an end elevation of the motor controlling mechanism.

Referring to the drawings, the positive film 1 is wound on a reel 2 and the negative film 3 is wound on a reel 4. These films are progressed from reels 2 and 4 on to reels 5 and 6 respectively.

Each film, such for example as the film 1, may be the usual transparent moving picture film having perforations 7 therethrough adjacent the edges thereof. Strips 8, 8 of thin, narrow metal ribbon are carried by each film, adjacent the inner edges of the perforations 7. As shown, a pair of metal strips 8 are preferably carried by each film, these strips on the negative film carrying the magnetic sound record in duplicate, which record is transferred to or copied on the corresponding metal strips on the positive film, preferably on an amplified scale.

The negative film 3 is progressed through what I may term a reproducing head 9, containing electro-magnets in which variations of magnetism are induced by the passage of the magnetic sound record between the same. The positive film 1 passes through what I term a recording head 10, containing electromagnets which are energized by amplifying circuit connections with the magnets in the head 9, so that a record of corresponding magnetic variation shall be impressed on the strips 8 of film 1 passing through head 10. Films 1 and 3 pass together past an exposure opening in the light box 11 where the photographic printing is effected.

A motor 12 is employed, this rotating a sheave 13 on shaft 14, sheave 13 being driven by a belt 15. Shafts 24 and 25 are rotated, each at the same speed, from shaft 14. Sprockets on shafts 24 and 25 progress films 1 and 3 at the same rate, and the take-up reels 5 and 6 are driven by connections from sheaves or pulleys 16 and 17 on shafts 24 and 25.

Preferably provision is made for progressing the two films at one or another of various speeds, and for correspondingly rotating reels 5 and 6 to take up the films. Such a change of speed may conveniently be accomplished by the mechanism shown in Fig. 12 in which shaft 14 carries a plurality of gears 18, 19, 20, etc. Shaft 14 is adapted to be moved longitudinally through its bearings 21, 21 and through sheave 13, to which it is keyed, a knurled head 22 being provided at the end of shaft 14 for adjusting the same. When the shaft is in the position shown in Fig. 12, gear 18 thereon will mesh with gears 23, 23 on shafts 24 and 25. When shaft 14 is pushed in somewhat, gear 18 will move out of mesh with gears 23 and gear 19 will move into mesh with gears 26, 26 on shafts 24 and 25. Correspondingly gear 20 is adapted to mesh with gears 27, 27 on shafts 24 and 25, whereby various speeds may be given the said shafts.

The apparatus may be supported by a main frame 28 carrying a table 29. Reels 2 and 4 are rotatively mounted on shafts 30 and 31 which are carried by brackets 32 and 33 extending upwardly and downwardly from the table or horizontal support 29. The heads 9 and 10 are carried from support 29 by supporting means 34 and 35 as is shown in Fig. 1. Reels 5 and 6 are rotatably mounted on shafts 36 and 37 which are carried by brackets 38 and 39 from support 29. The light box 11 may be supported by a standard 40 and may itself serve as a support for table 29.

Driving connection for reel 5 is effected by a belt 41 which extends from sheave 16 on shaft 24 to a sheave 42 on shaft 36 and correspondingly reel 6 is rotated by a belt 43 which extends from sheave 17 to a sheave 44 on shaft 37.

A friction or yielding device should be inserted in the driving connection of the reels 5 and 6 to prevent the possibility of breaking the films. A suitable arrangement is shown in Fig. 11 in which sheave 42 is loosely mounted on shaft 36 but is frictionally secured thereto by a friction disc 45 which is secured to shaft 36, sheave 42 being pressed into engagement with disc 45 by means of a spring 46 on shaft 36, the tension of which is adjusted by a nut 47 mounted on a screw threaded portion of the shaft. In the same manner, sheave 44 is connected to shaft 37 by a friction disc 48.

The reels 2 and 4, from which the films are drawn, should be held frictionally so that the films will be drawn evenly therefrom. An arrangement by which this may be accomplished is indicated in Fig. 13 in which retarding friction discs 49 and 50 are secured on shafts 30 and 31, retarding friction fingers 51, 51, bearing upon the friction discs with an adjustable tension controlled by springs 52, 52, upon the short shafts 53, 53, upon which fingers 51 are mounted. Tension of springs 52 is adjusted by ratchets $53^a$ on shafts 53, cooperating with pawls $53^b$.

The upper or positive film 1 is guided between idlers 54, 54, on the entrance side of the head 10 and by idlers 55, 55, after it has passed through head 10. Similarly, film 3 is guided by idlers 56, 56 and 57, 57, idlers 54 and 56 being carried by brackets 58, 58′ and idlers 55 and 57 by brackets 59, 59′ which extend upwardly and downwardly, respectively, from table 29.

The films which are thus spaced apart when they pass through the heads 10 and 9 are brought into parallel contacting relation as they enter the light box 11, the two films passing together between idlers 60 and 61 which are secured on brackets extending upwardly and downwardly, respectively, from table 29. After passing through the light box, the films pass between a similar pair of idlers 62, 63. After this the film 1 passes over an idler 64, thence under sprocket 65 which is fast on shaft 24 (Fig. 12), thence over idler 66, from which point the film is led on to reel 5. Similarly the film 3 passes under idler 64′, thence over sprocket 65′ and under idler 66′ from which point the film passes on to the reel 6.

In the recording head 10 the film 1 passes through a horizontal slot 67 between the cores or pole pieces 68 and 69 of a pair of upper electro-magnets 70 and 71 and the cores or pole pieces 72 and 73 of a pair of lower electro-magnets 74 and 75. The upper pole pieces 68 and 69 are spring-pressed into engagement with the upper surfaces of the metal strips 8, 8, on the film 1 and the lower pole pieces 72, 73, are spring-pressed into engagement with the under surface of the film in longitudinal alignment with the metal strips 8, 8. If the films 1 and 3 are each provided with a single magnetizable strip as 8, it is, of course, only necessary to provide the heads 10 and 9 with upper and lower electromagnets operating with the single strip in each instance.

Each core piece such as 69 may be carried by a spring strip 76 the ends of which are slidably mounted on pins 77 which extend upwardly from the casing, strip 76 being pressed downwardly by spiral springs 78 which surround pins 77 and bear at their upper ends on the heads of pins 77 and at their lower ends against the strip 76. The other core pieces are spring-pressed into contacting position in similar manner.

The lower electro-magnets 74 and 75 are preferably secured in blocks 79 which are secured to the bottom of the casing while the upper electro-magnets are secured in blocks 80, 80 which are adjustable in the longitudinal direction of the film, these blocks being secured in adjusted position by means of set screws 81, 82. By this means the upper core pieces may be separated a slight distance in the longitudinal direction of the film from the core pieces of the corresponding lower electro-magnets, as I find that an improved effect is obtained when there is a slight gap in the longitudinal direction of the film between the upper and lower pole pieces. The casing of the head 10 is preferably made with separable upper and lower portions, which may join together at the horizontal central plane indicated at 83.

The construction of the lower head 9 is preferably identical with that of the upper head 10 and accordingly will not be described in detail. The mechanical arrangement of the recording and reproducing electro-magnets and their casings is preferably the same as that which is described in my copending application production and reproduction of talking motion pictures referred to above.

Electrical connections whereby the magnetic sound record on the metal strips carried by the negative film 3 are reproduced on the metal strips 8 of the positive film 1, will now be described, referring to Fig. 9. Each one of the recording and reproducing electro-magnets is provided with a primary and a secondary winding, each secondary winding having many more turns than the corresponding primary windings.

Considering one upper and the corresponding lower electro-magnet of the reproducing head 9, the upper electro-magnet is provided with a primary winding 100 and a secondary winding 101′ while the lower electro-magnet is provided with primary winding 100′ and a secondary winding 101. When the metal strip carrying a magnetic sound record is progressed between the pole pieces of the upper and lower electro-magnets, an electric current which fluctuates in accordance with the variations of magnetic intensity in the magnetized metal ribbon of the film will be induced in the primary windings 100, 100′, the circuit extending to terminals 102 and 103, and thence through conductors 99 and 98 to an amplifying device 97. A corresponding fluctuating current will be induced in the secondary windings 101, 101′, these being connected, in series with each other and with the terminals 102 and 103, the result being that a fluctuating current from both the primary and secondary windings, one reenforcing the other, flows into the amplifying device 97. I prefer to use an amplifier of the audion type such as any well known audion amplifier, the details of which need not be illustrated.

The upper and lower reproducing electro-magnets on the opposite side of the film, which coact with the other magnetic sound record carried by the film, are wound in exactly the same way, and are connected by connections similar to those shown to the same connection points 102 and 103 to which wires 98 and 99 are connected.

The input circuit shown on the right in Figure 9 is substantially the same as the circuit shown in Figure 3ª of my said Patent 1,612,359, and the output circuit shown at the left in Figure 9 is understood to be the same as the circuit shown in Figure 3 of my said patent.

The fluctuations of current entering amplifier 97 are greatly amplified. The amplified fluctuating current flows from the amplifier terminal 95 through conductor 95′, through primary winding 88 of an induction coil 86, through conductor 94, through the usual battery B and thence through conductor 96′ to the amplifier terminal 96. Conductor 94 also connects to a resistance R, the other side of which is connected by conductors 94′ and 89′ to the primary 84′ of the erasing coil. The negative of battery B is connected by conductors 91 and 89 to the primary 84 of the recording coil, the secondary 85′ of this coil being connected to the secondary 87 of coil 86 by means of conductors 90 and 87′.

Considering one upper electro-magnet and the corresponding lower electro-magnet of the recording head 10, the upper electro-magnet is provided with a primary winding 84 and secondary winding 85 while the lower electro-magnet is similarly provided with primary and secondary windings 84′ and 85′. These windings are connected together and to conductors 89 and 90 in the same manner that the windings of the reproducing head, described above, are connected to each other and to the conductors 98 and 99. In both the recording and reproducing electro-magnets the secondary windings should be next to the core in each instance.

As a result of the construction described, the cores of the recording electro-magnets will be magnetized with an intensity which varies at each moment in accordance with the fluctuations of current in circuit 89 and 90 and the metal ribbons 8, carried by the positive film 1, will have corresponding variations of magnetic intensity impressed thereon. The fluctuating current delivered to the amplifier 97 from reproducing head 9 will be reproduced, greatly modified, in the coils of the recording magnets of recording head 10, and the magnetizable film ribbon passing through head 10 will be magnetized in the desired manner.

The two films pass together across an exposure opening in the light box 11, at which point the pictures on the positive film are printed in the usual manner, the light passing through the negative images on film 3. Means should be provided for adjusting the effective length of the exposure opening across which the films pass, the details of which it is not thought necessary to illustrate.

The starting and stopping of motor 12, or the starting and stopping of reels 5 and 6, constitutes a feature of my invention. At a convenient point on table 29 three push buttons 104, 105 and 106 are arranged, in the preferred embodiment of my invention. Button 104 controls the starting of motor 12, whereupon the motor circuit is closed and latched in closed position. Button 105, when depressed, serves to trip the latching device referred to, so as to stop the motor if button 104 is in raised position. Button 106 closes a locking circuit, the actuation of which makes it impossible to start the motor until the trip button 105 has first been depressed.

These results are effected by means of a number of electro-magnets which are shown within a frame 107 adjacent to the motor.

The circuit connections for these devices are indicated in Fig. 8. Motor 12 may be operated from mains 108 by means of a plug and socket connection indicated at 109, 109′, the motor circuit being indicated in heavy lines.

Upon pressing the starting button 104, current flows from battery, or any convenient source, 110, through connection 111, thence through contacts 112 which are closed by button 104, thence through connection 113, through a pair of electro-magnets 114 and 115, in series, and thence by connection 116 back to battery. Electro-magnets 114 and 115, upon being energized, attract their armatures which are secured respectively upon levers 117 and 118 which are pivoted respectively at 119 and 120. The right hand ends of levers 117 and 118 are accordingly depressed to close contact at 121 and 122 and their left hand ends are raised to close contact at 123 and 124, the stationary contacts of the two pairs referred to being carried by standards of insulating material 125 and 126. Levers 117 and 118 are of conducting material and the motor circuit is accordingly established through levers 117 and 118 and the contacts which have just been closed, as above described.

Referring to Fig. 14, one of the levers 117 and 118 is provided at its right hand end with an upwardly extending member 127. A horizontal pin 128 is slidably mounted in a pair of vertical frame members 129 and 130 of the relay casing 107. This pin carries an armature 131 which is adapted to coact with the electro-magnets 132 and 133. A spiral spring 134 surrounds pin 128 and bears against armature 131, to press the pin to the right, referring to Fig. 14. When so pressed, and when the armature levers 117 and 118 are in neutral position, the forward end of pin 128 bears against the face of a boss 135 on the vertical extension 127.

When starting button 104 has been depressed, to energize electro-magnets 114 and 115, the vertical member 127 will be lowered so that the forward end of pin 128 will be forced by spring 134 over the top of boss 135. Accordingly, levers 117 and 118 will be locked in the positions in which the same have been swung by the energizing of electro-magnets 114 and 115, and the connections of the motor circuit will remain closed after the starting button 104 has been released. It will be noted that the armature levers indicated at 117 and 118 are rigidly connected to swing together, as by connecting strips 117ᵃ and 117ᵇ of insulating material.

When the motor is to be stopped button 105 is depressed whereupon circuit is completed from battery 110 through connection 111 and the spring contacts 136 of button 105, and through electro-magnets 132 and 133 and back to battery by connection 116. The electro-magnets 132 and 133 being energized attract their armature 131 whereupon pin 128 is withdrawn from its latching position above lug 135, and levers 117 and 118 swing back into their neutral positions, breaking the motor circuit.

It is sometimes desirable to prevent operation of the apparatus, in which case button 106 is depressed to close contact across the spring contacts 137.

When button 106 is depressed, current will flow from battery 110, through conductor 111, contacts 137, conductor 138, electro-magnets 139 and 140, in series, and back to battery through conductor 116. The energization of electro-magnets 139 and 140 raises arm 127 (Fig. 14) above its normal position so that the end of pin 128 will catch under the boss 135, thereby locking armature levers 117 and 118 in a position in which the motor circuit is open and cannot be closed by depressing button 104. In order to operate the apparatus it is accordingly necessary to depress the trip button 105 whereupon electro-magnets 132 and 133 will be energized to withdraw pin 128 from its engagement with lug 135, thus permitting armature levers 117 and 118 to return to their neutral positions.

An automatic stop should also be provided to prevent further feeding of the films when either reel 5 or 6 becomes filled. Accordingly a stationary contact member 141 is provided, and also a contact member 142 comprising a spring strip, the upper and lower ends of which, 143, are adapted to be engaged by the film wound up on reels 5 and 6 respectively, when these reels have been filled. The contact members mentioned may be carried by table 29 as is indicated in Fig. 1.

Members 141 and 142 are provided with contact points at their upper and lower ends, the upper contacts being brought together when the upper reel is filled and the lower contacts when the lower reel is filled. In either case circuit will be completed to energize the trip magnets 132 and 133. In such a case current flows from battery 110 through conductor 116, electro-magnets 133 and 132, thence through conductor 144, lever 145 which is pivotally mounted at 146, contacts 147, conductor 148, contacts on members 142 and 141, and thence by conductor 149 back to battery. It will be understood that lever 145 moves with levers 117 and 118 and may be connected thereto by strips 117[a] and 117[b] of insulating material, previously referred to. Accordingly, when button 104 has been actuated contacts 147 will be closed. The result of energizing electro-magnets 132 and 133 will be to unlatch pin 128 from boss 135 so as to open the motor circuit as previously explained.

It is thought that the operation of the device will be entirely clear from the above description. It should be understood that my invention is not limited strictly to the details of construction described but is as broad as is indicated by the accompanying claims, and also that my invention includes various sub-combinations of elements which are set forth in some of the claims. For example, a testing machine may be constructed having many of the features of the complete apparatus described herein in which a film or continuous strip bearing the magnetic sound record is run from a reel such as that shown at 2, to a reel such as that shown at 5 and through a reproducing head such as that shown at 10, suitably connected to telephone transmitters or the like, for testing the reproduction of the magnetic record impressed on the strip 8.

Suitable wiring connections for the circuits described above are indicated in Fig. 10.

What I claim is:—

1. In an apparatus for reproducing film carrying synchronized and registering sound and light records, the combination of means for continuously progressing a film having negative pictures thereon and also a magnetic sound record thereon, means for progressing at the same rate a positive film having a strip of magnetizable material thereon, means for printing positive pictures from said negative pictures on said positive film, and means for reproducing said magnetic sound record on said strip of magnetizable material, during the progress of said films.

2. In an apparatus for reproducing film carrying synchronized and registering sound and light records, the combination of a pair of electro-magnets, means for progressing between the pole pieces thereof a strip which is permanently magnetized with a varying intensity corresponding to sound vibrations, a second pair of electro-magnets, means for progressing between the pole pieces thereof a strip of magnetizable material, each of said electro-magnets having primary and secondary windings thereon, a circuit in which the primary and secondary windings of said first pair of electro-magnets are connected, a circuit in which the primary and secondary windings of said second pair of electro-magnets are connected, and means for causing the fluctuations of current in said first circuit to be reproduced in said second circuit.

3. In an apparatus for reproducing film carrying synchronized and registering sound and light records, the combination of supply and take-up reels, a reproducing head, electro-magnets therein, means for guiding a strip which is permanently magnetized with a varying intensity corresponding to sound vibrations, from said supply reel through said head, between the pole pieces of said electro-magnets, and onto said take-up reel, a shaft, means for progressing said strip therefrom, a prime mover, and means for rotating said shaft therefrom at various adjustable speeds.

4. An apparatus for reproducing film carrying synchronized and registering sound and light records, the combination of upper and lower supply and take-up reels, means for progressing, at the same rate, a positive film from the upper supply to the upper take-up reel and a negative film from the lower supply to the lower take-up reel, said positive film carrying a strip of magnetizable material and said negative film a strip which is permanently magnetized with a varying intensity corresponding to sound vibrations, a light box, means for causing said films in passing from said supply reels to said take-up reels to pass in contact with each other across the exposure opening of said box, to print on the positive film from the negative film, recording and reproducing heads, means for causing the positive and negative films respectively in passing from said supply reels to said take-up reels to pass through the same, said heads containing electro-magnets aligned with said magnetizable and magnetized strips, and means for causing a fluctuating current to flow through the electro-magnets of said recording head corresponding to the current induced in the windings of the electro-magnets of said reproducing head by the passage of the magnetized strip past the same, said printing and magnetizing means cooperating to reproduce upon the positive film the sound and light records carried by the negative film in similar synchronism and registration.

This specification signed this 6th day of January, 1926.

HARRY E. CHIPMAN.